Figure 1:
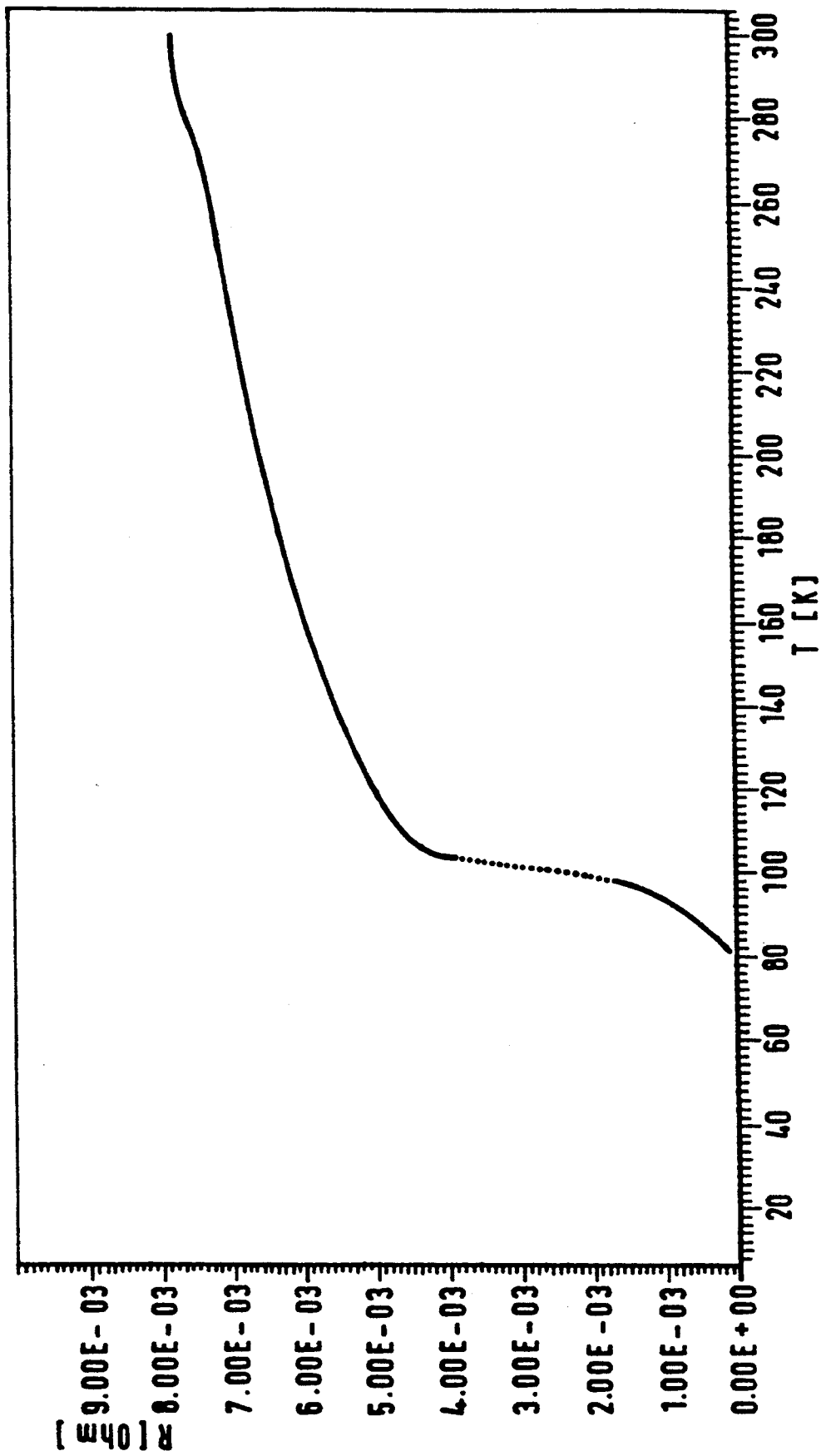

United States Patent [19]

Becker

[11] Patent Number: 5,346,538
[45] Date of Patent: Sep. 13, 1994

[54] MOLDING OF SINTERED STRONTIUM/CALCIUM INDATE AND THE USE THEREOF

[75] Inventor: Winfried Becker, Kelkheim, Fed. Rep. of Germany

[73] Assignee: Hoechst Aktiengesellschaft, Frankfurt am Main, Fed. Rep. of Germany

[21] Appl. No.: 720,494
[22] PCT Filed: Dec. 23, 1989
[86] PCT No.: PCT/EP89/01606
  § 371 Date: Jun. 27, 1991
  § 102(e) Date: Jun. 27, 1991
[87] PCT Pub. No.: WO90/07476
  PCT Pub. Date: Jul. 12, 1990

[30] Foreign Application Priority Data

Dec. 29, 1988 [DE] Fed. Rep. of Germany ....... 3844208

[51] Int. Cl.$^5$ ............... B28B 7/34; C04B 35/02
[52] U.S. Cl. .................... 106/38.9; 106/38.2; 501/123; 505/782; 505/785
[58] Field of Search ............ 106/38.2–38.9; 501/123; 505/782, 785

[56] References Cited

FOREIGN PATENT DOCUMENTS 977835 12/1964 Guinea.
56-39462 4/1981 Japan ............ G01N 31/22

OTHER PUBLICATIONS

Naturforschung, 19b (Aug. 1964), pp. 955–957, Schwartz and Bomment.
Z. Anorg. Allg. Chem. vol. 435 (1977), W. Muschick et al., pp. 56–60, no month given.

*Primary Examiner*—Paul Lieberman
*Assistant Examiner*—Margaret Einsmann
*Attorney, Agent, or Firm*—Curtis, Morris & Safford

[57] ABSTRACT

Alkaline earth metal indates of the formula $(Sr,Ca)In_2O_4$ can be converted by sintering or fusing into compact moldings which, owing to their stability are suitable even at temperatures of at least 800° C. as reaction vessels for chemical reactions in the presence of bismuth (III) oxide and/or alkaline earth metal oxides.

8 Claims, 6 Drawing Sheets

MOLDING OF SINTERED STRONTIUM/CALCIUM INDATE AND THE USE THEREOF

DESCRIPTION

The present invention relates to moldings composed of sintered strontium indate of the formula (Sr,Ca)In$_2$O$_4$, to a process for the preparation thereof and to the use of these moldings as vessel material for chemical reactions, during which bismuth oxide, if appropriate together with alkaline earth metal oxides, occur (sic) as a reactant at high temperatures.

The compound strontium indate has been known for a fairly long time (Z. Naturforschung 19b (1964) 955) . CaIn$_2$O$_4$ is isotypic with SrIn$_2$O$_4$. The crystal structure of these indates is known (Z. Anorg. Allg. Chemie 398 (1973) 24). The indates can be obtained from In$_2$O$_3$ and an alkaline earth metal oxide by heating at 1200° C.

Bismuth oxide shows—particularly at relatively high temperatures—markedly basic behavior. It melts at 824° C. and strongly attacks melting crucibles and silicates. According to observations by Arpe and Müller-Buschbaum (J. Inorg. Nucl. Chem. 39 (1977) 233), even Al$_2$O$_3$ is dissolved and converted to bismuth aluminates.

It was therefore the object to find a crucible material which is resistant at high temperatures, in particular at temperatures above 800° C., to molten bismuth(III) oxide. The present invention achieves this object.

The invention is based on the finding that moldings composed of sintered strontium/calcium indate, (Sr,Ca)In$_2$O$_4$, are stable in the presence of molten bismuth(III) oxide even at high temperatures.

These moldings can be produced by compacting a fine powder of strontium indate, calcium indate and/or solid solutions of the formula Sr$_x$Ca$_{1-x}$In$_2$O$_4$ with $0<x<1$, if appropriate with the addition of binders, to give a molding and heating the latter for several hours to temperatures from 1000° to 1500° C. Under these conditions, sintering takes place. The sintering time extends to at least 2 hours even at 1500° C. At lower temperatures, the sintering takes longer. It should not be continued unnecessarily, since otherwise the formation of large crystals is promoted, which adversely affects the strength of the moldings.

Calcium indate melts above 1500° C. Strontium indate melts only above 1600° C. Fine grinding of the strontium indate powder used for sintering is advantageous. Molding can be carried out by known processes, for example by extrusion (bars, tubes) or by compaction (uniaxial or isostatic). Strontium indate can also be fused and allowed to solidify in molds, in order to obtain moldings.

The moldings obtained can assume the shape of spheres, tubes, ingots or bars, preferably that of reaction vessels such as crucibles, or the form of plates. Crucibles can also be produced by milling-out from an ingot.

A main difficulty in producing thin superconductive layers from the hitherto known oxidic materials on a carrier is the contamination of the superconductor by the carrier material. After the oxidic materials have been applied, a hermal aftertreatment is as a rule necessary in order to adjust the oxygen content in the superconductive layer. At this time, the superconductor reacts with the substrate material. This can be detected by measuring the concentration profile of the cations of the carrier material in the superconductor layer as a function of the distance from the surface of the carrier. Layers contaminated by cations have very poor superconductive properties (low T$_c$, broad transitions). (Sr,Ca)In$_2$O$_4$ is inert to the known oxidic superconductor materials (containing Bi$_2$O$_3$, SrO, CaO, CuO) even at 1000° C. It is therefore suitable, in the form of ceramic sintered bodies or bodies solidified from the melting point (sic), in particular in the form of plates, or in the form of single crystals, as a substrate material in the production of thin superconductive layers by processes such as, for example, CVD (chemical vapor deposition), spray coating, sputtering or ion beam vaporization, in which a thermal aftertreatment of the coated substrates is necessary. For example, thin oxide layers (less than 5 μm) can be applied by ion beam vaporizing, sputtering, laser vaporizing or CVD, and thick oxide layers (thicker than 5 μm, in particular thicker than 10 μm) can be applied by screen printing or plasma spraying.

Sintered indate (Sr,Ca)In$_2$O$_4$ is also outstandingly suitable as a crucible material for the solid-state reaction of the oxides of bismuth, strontium, calcium and copper to form phases having HT superconductivity, and generally for producing ceramics having a content of Bi, In or Tl. This is of interest inasmuch as the formation of the superconductive phase in the Bi-Sr-Ca-Cu-O system, which has a transition temperature of 110 K., takes place only at temperatures just below the melting point of the mixture. When such sintering experiments are carried out in crucibles or on carrier plates of Al$_2$O$_3$, the latter are strongly attacked and contaminated products of unsatisfactory quality, i.e. a low content of 110 K. phase, are obtained. If, however, the reaction is carried out on a substrate of sintered strontium indate, calcium indate or a Sr-Ca indate, the content of the desired 110 K. phase is increased, under otherwise identical conditions. Furthermore, it becomes possible to work at higher sintering temperatures. It is not necessary for the carrier to be composed of solid indate. Preferably, it is composed of a ceramic, for example. Al$_2$O$_3$, to which a thin layer of indate has been applied, for example by plasma spraying or by screen printing.

In place of pure SrIn$_2$O$_4$ or pure CaIn$_2$O$_4$, the solid solutions of the formula Sr$_x$Ca$_{1-x}$In$_2$O$_4$ with $0<x<1$, in particular $0.91<x<1$, in particular $0.91<x<1$ (sic), can also be used. Moldings composed of these solid solutions can be prepared by mixing the two indates, or starting from the mixture of the three oxides in an In$_2$O$_3$:alkaline earth metal oxide molar ratio of 1:1, by sintering or fusion, and can be used in the same way as moldings composed of pure strontium indate.

The invention is explained in more detail by the examples.

EXAMPLE 1

SrIn$_2$O$_4$ powder is prepared according to H. Schwarz and D. Bommert; Z. Naturforsch. 19b (1964) 955. It is then ground in acetone as the grinding medium together with zirconiumdioxide balls (ten times the quantity by mass) in an attritor mill for 3 hours at 1000 rpm. The grinding balls are screened off and the solvent is distilled off in a rotary evaporator. The remaining powder is dried at 80° C. It can easily be compacted without additives to give plates or ingots, either isostatically or uniaxially. Further investigations have shown that the material sinters, starting at 1000° C.

An ingot (about 1×2×6 cm) isostatically compacted under 300 MPa has a green density of 63% of the theoretically attainable density (density of the single crystal 6,907 g/cm$^3$). The sintering is carried out in accordance with the following program: heat to 1000° C. in 2 hours, heat further to 1500° C. in 5 hours, hold this temperature for 5 hours and then cool to 100° C. in 5 hours. The sintered ingot has a density of 6.413 g/cm$^s$ (i.e. 93% of the theoretically obtainable density). It can then be worked, for example sawed into plates.

EXAMPLE 2

Figure 2:
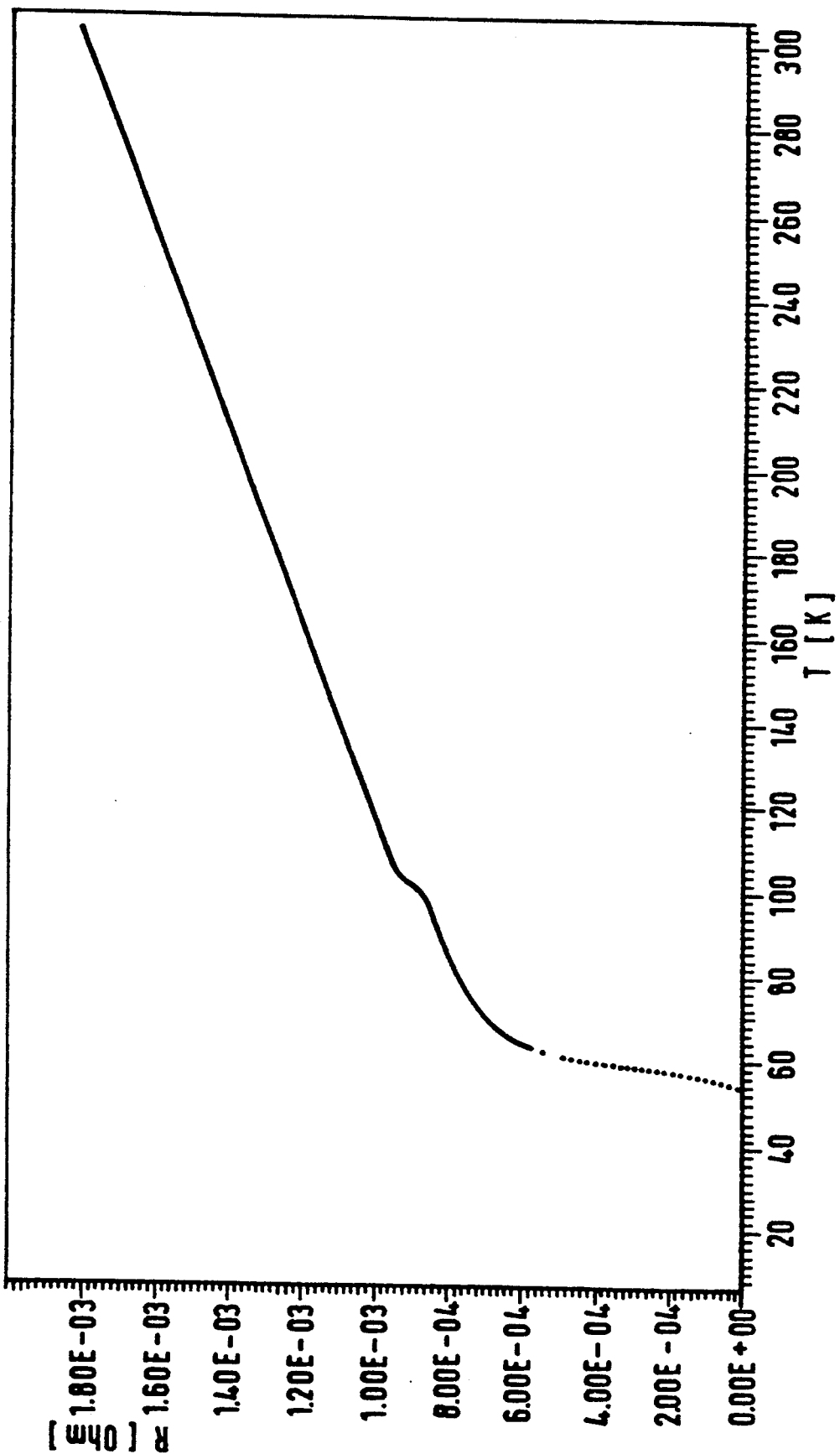

A plate of SrIn$_2$O$_4$ (diameter 40 mm, 3 mm thick) prepared according to Example 1 is used as a firing base for a uniaxially compacted molding (diameter 10 mm, thickness 1 mm) composed of the mixture of the metal oxides having the empirical composition Bi$_4$Sr$_3$Ca$_3$Cu$_6$O$_{18+\alpha}$. After treatment for 100 hours at 845° C., the sample is removed from the furnace. The molding does not react with the substrate material. Melt oozing out of the molding does not wet the SrIn$_2$O$_4$ plate. The sintered body does not stick to the surface of the plate after cooling. Indium is not detectable in the sintered body. The conductivity measurement shows a superconductive transition at 105 K. (FIG. 1, measured on heating, 0.01 Å). A sample sintered under the same conditions on a firing base of alumina has a critical temperature of about 60 K. with only a small content of a phase which becomes superconductive at 105 K. (FIG. 2, measured as FIG. 1).

Example 3

Figure 3:
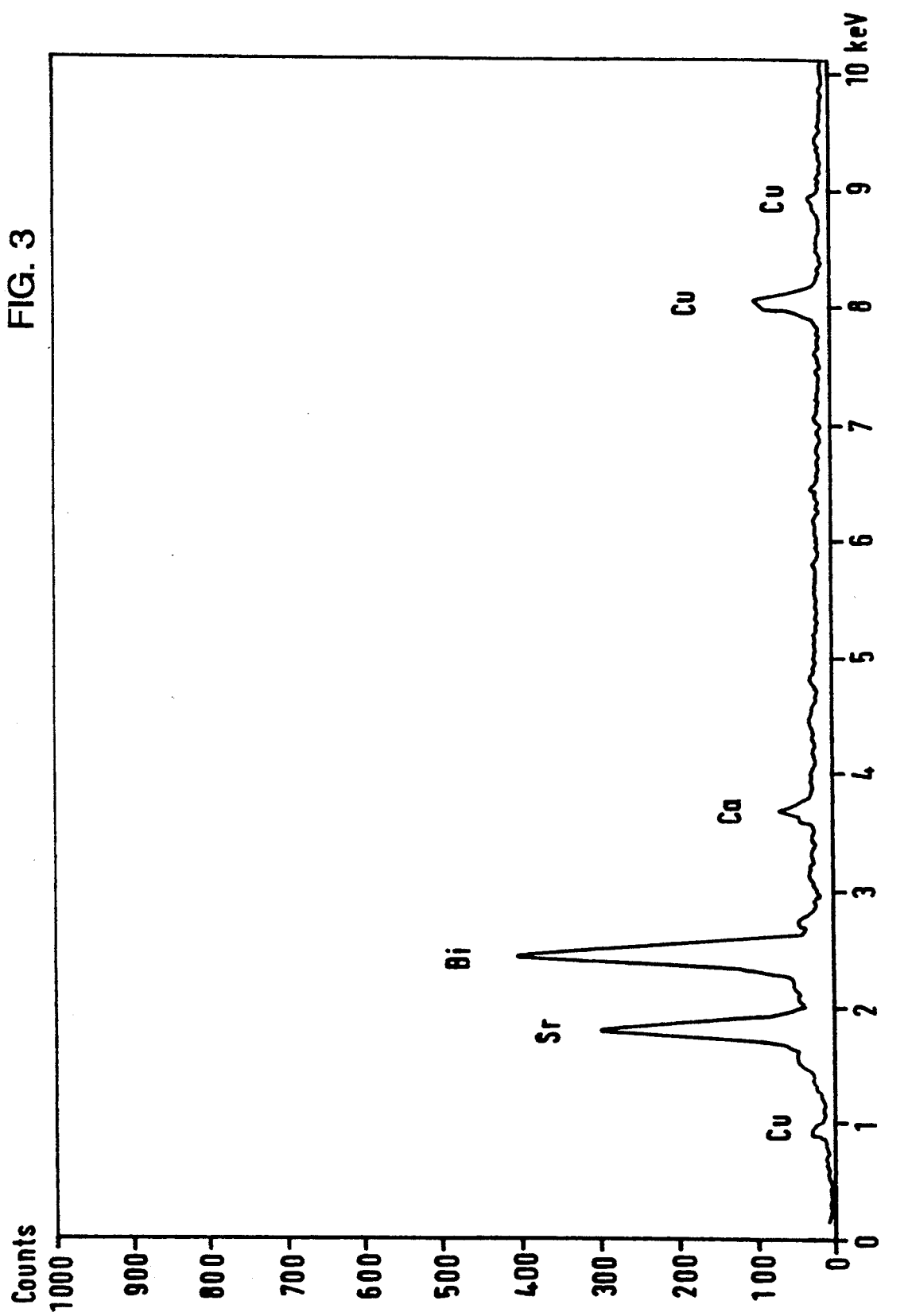
Figure 4:
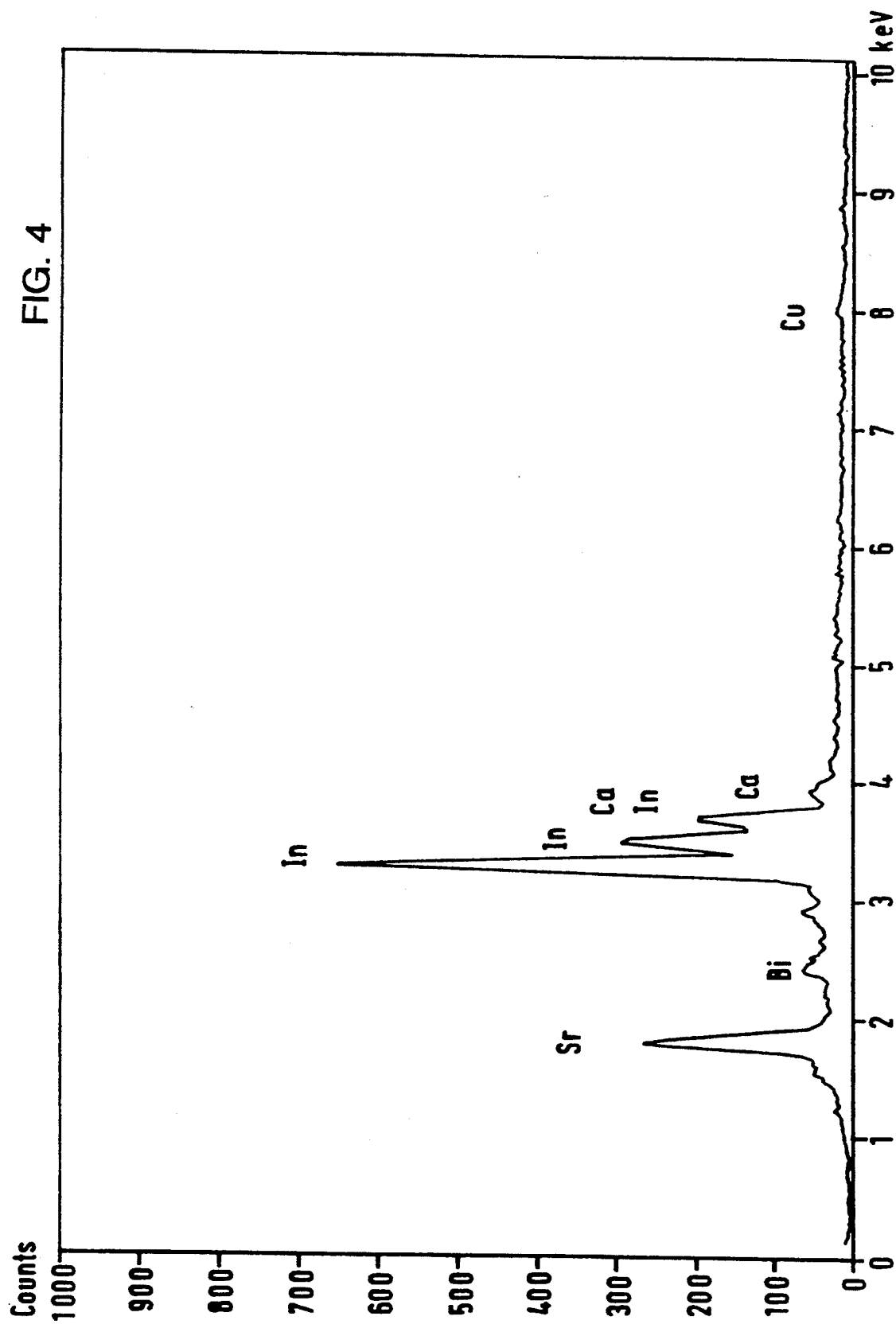

Solid solutions of the composition (Sr,Ca)$_1$In$_2$O$_4$ (Sr:Ca=2:1) were kept for about 10 hours in a melt of a Bi/Sr/Ca/Cu superconductor. Energy-dispersive X-ray analyzers show no contamination of the superconductor by indium (FIG. 3). Only traces of bismuth and copper are afterwards detectable in the solid solutions themselves (FIG. 4).

EXAMPLE 4

Figure 5:
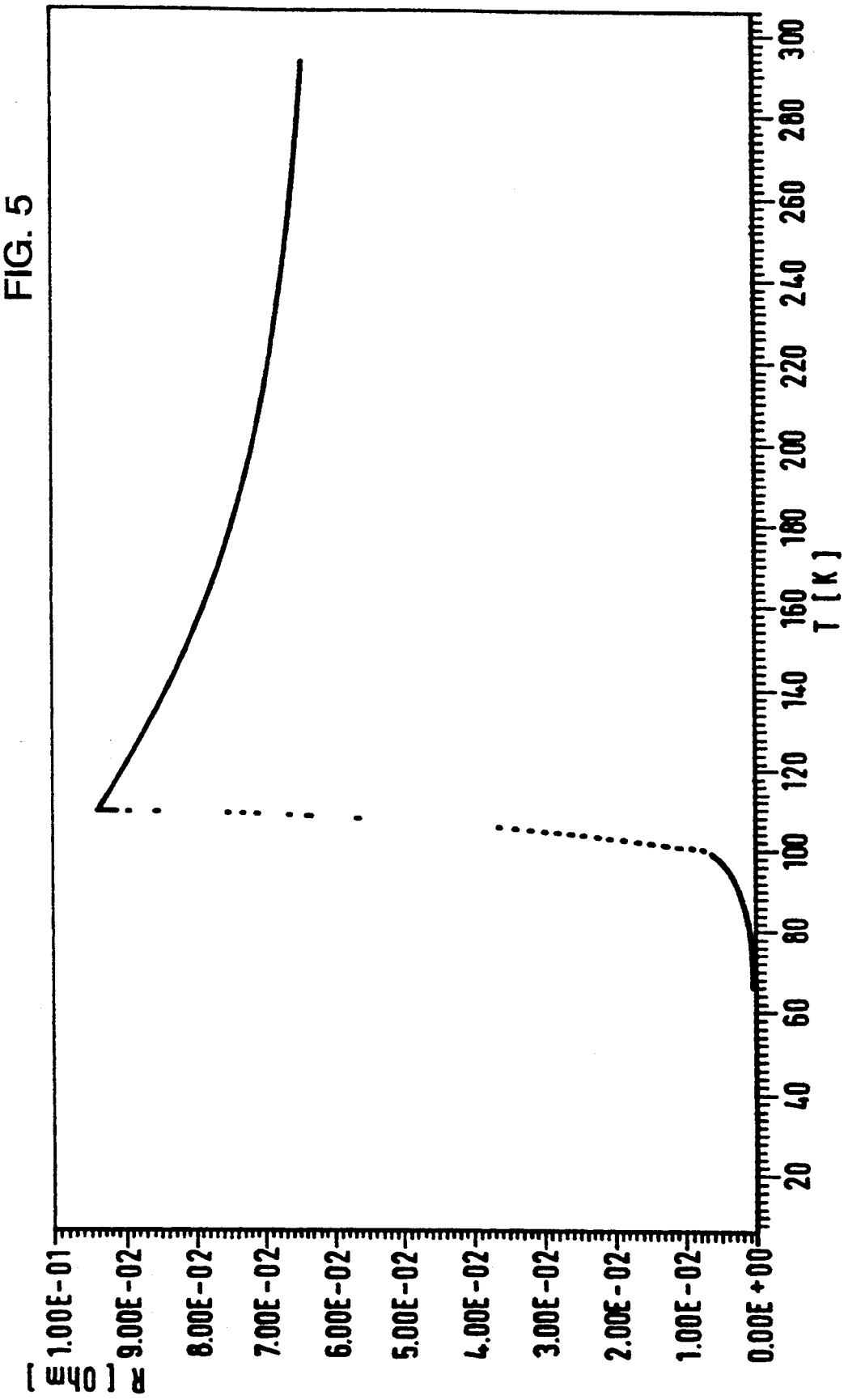
Figure 6:
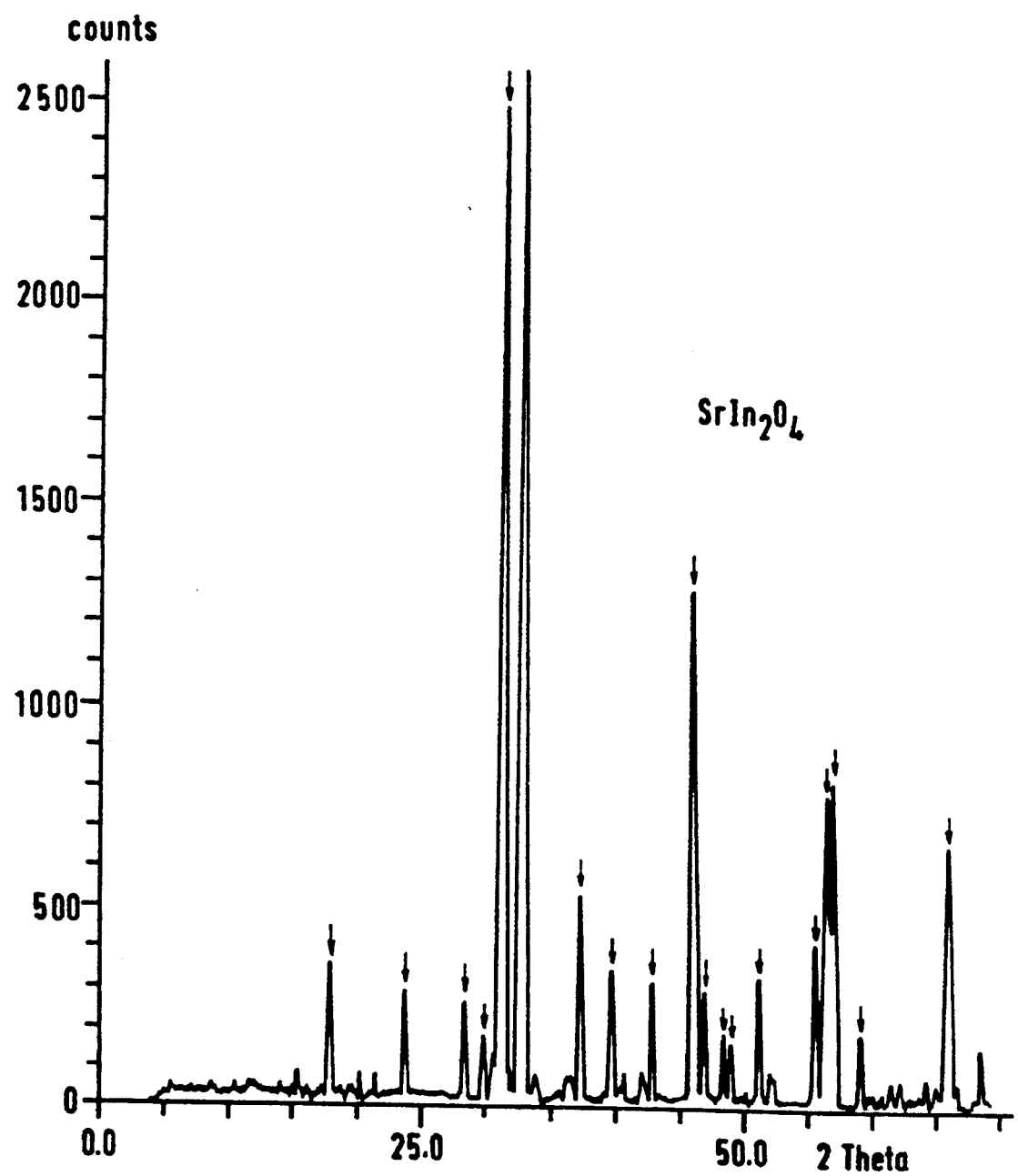

3.1250 g of In$_2$O$_3$, 1.7508 g of Bi$_2$O$_3$, 0.8763 g CaO, 4.4736 g of SrCO$_3$ and 2.4106 g of CuO are weighed out and intimately mixed in an agate mortar. The mixture is then pre-reacted for 6 hours at 800° C. in a corundum crucible. The temperature is then raised to 1000° C. and maintained for 6 hours at 1000° C. This is followed by cooling to 300° C. within 4 hours, and the sample of the empirical composition Bi$_{0.5}$In$_{1.5}$Sr$_2$CaCu$_2$O$_x$ is removed. The sample is once more homogenized in an agate mortar and then compressed into tablets (diameter: 1 cm, thickness: about 2 mm). These are then sintered for 30 hours at 1000° C. on an Al$_2$O$_3$ base and removed from the furnace after cooling to 100° C. (3 hours). A sample prepared in this way shows a critical temperature of 110 K. (FIG. 5). Essentially SrIn$_2$O$_4$ and Bi-containing superconductive phases are found in the X-ray diagram. The X-ray diagram of SrIn$_2$O$_4$ is shown in FIG. 6.

A comparison of FIG. 5 with FIG. 2 shows that the presence of SrIn$_2$O$_4$ in the reaction batch has a favorable influence on the formation of the 110 K. phase.

EXAMPLE 5

200 g of strontium indate are ground with 2500 g of ZrO$_2$ grinding balls in ethanol as the grinding medium for 4 hours in an attritor mill at 500 rpm. The grinding balls are removed by screening and the solvent is removed in a rotary evaporator. The remaining powder is dried at 80° C. 85 ml of water and 4.15 g of an oligomeric ammonium polyacrylate as a dispersant are added to 200 g of ground strontium indate powder, and the whole is mixed together with about 10 Al$_2$O$_3$ mill stones of 20 g in total for 24 hours on a roller block.

The resulting slip is cast into a frustoconical hollow gypsum mold. The gypsum absorbs the water from the slip, with the formation of an indate layer. After about 15–30 minutes, the still liquid part of the slip is decanted again. A moist cake of 1–4 mm wall thickness remains. After a further 1–2 hours, this crucible blank has shrunk to such an extent that it can be taken out of the mold. It is dried for 5 hours in a desiccator over calcium chloride and then sintered. The following temperature program is used here:

Heat to 200° C. in 90 minutes; hold for 1 hour at 200° C.; heat further to 400° C. in 90 minutes; hold for 90 minutes at 400° C.; heat to 1200° C. in 10 hours; heat further to 1500° C. in one hour; hold for 2 hours at 1500° C. and cool to 100° C. in 5 hours.

This gives a crucible of sintered SrIn$_2$O$_4$, having a density of 95% of theory.

EXAMPLE 6

Example 5 is repeated, but using Ca indate in place of Sr indate. The tempering program for the dried crucible blank is as follows:

Heat to 150° C. in 5 hours, increase the temperature to 400° C. in a further 5 hours (the dispersant and the moisture being removed). The temperature is then raised to 1200° C. in 5.5 hours and to 1500° C. in one hour and held at 1500° C. for two hours, and the product is cooled to 20° C. in five hours. To prepare the starting product, an equimolar mixture of CaO and In$_2$O$_3$ was heated for 8 hours at 1200° C., and the powder was homogenized in an agate mortar and then heated for a further 12 hour at 1200° C.

I claim:

1. A method for using a molding for performing a chemical reaction in the presence of molten bismuth (III) oxide at temperatures of at least 800° C.; said method comprising forming a reaction vessel from the molding wherein the molding is composed of sintered indate or indate solidified from a melt of the formula (Sr,Ca)In$_2$O$_4$; and conducting the reaction in the vessel; wherein the bismuth (III) oxide is present in the vessel and does not react with the indate.

2. A method for using a molding for performing a chemical reaction in the presence of alkaline earth metal oxide at temperatures of at least 800° C; said method comprising forming a reaction vessel from the molding wherein the molding is composed of sintered indate or indate solidified from a melt of the formula (Sr,Ca)In$_2$O$_4$; and conducting the reaction in the vessel; wherein the alkaline earth metal oxide is present in the vessel and does not react with the indate.

3. A method of using a molding in the preparation of high-$T_c$-superconducting oxidic material from oxidic material comprising the oxides of Bi, Sr, Ca and Cu, said method comprising reacting the oxidic material in the molding, wherein the molding is of compact indate of the formula (Sr,Ca)In$_2$O$_4$, said reacting comprising thermally treating the oxidic material in the molding at a temperature $\geq$ 800° C; and no reaction occurs between the oxidic material and the indate.

4. A method as claimed in claim 3, wherein the molding is prepared by compacting a fine powder selected from the group consisting of calcium indate, strontium indate, an indate of the formula Sr$_x$Ca$_{1-x}$In$_2$O$_4$ with $0<x<1$ and mixtures thereof; and, heating the compacted fine powder for a sufficient time at a temperature from 1000 to 1500° C.

5. A method as claimed in claim 1, wherein the sintered indate is prepared by sintering or fusing a pulverulent equimolar mixture of $In_2O_3$ and an alkaline earth metal oxide selected from the group consisting of CaO and SrO.

6. A method as claimed in claim 3, wherein the molding has the shape of a plate.

7. A method as claimed in claim 6, wherein the contacting of the oxidic material with the molding is by coating the oxidic material as a layer onto the surface of the plate.

8. A method as claimed in claim 4, wherein the fine powder additionally comprises a binder.

* * * * *